March 15, 1938.  W. H. LESLIE  2,111,269
MOTOR CONTROL SYSTEM
Filed April 5, 1937  3 Sheets-Sheet 1
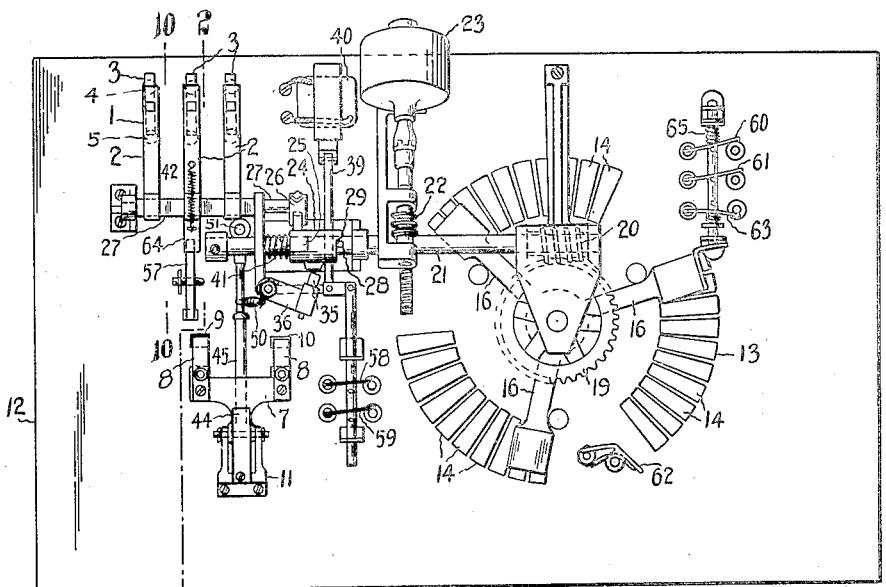
Fig. 1.
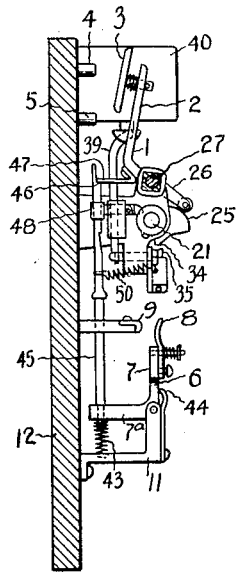
Fig. 2.   Fig. 3.
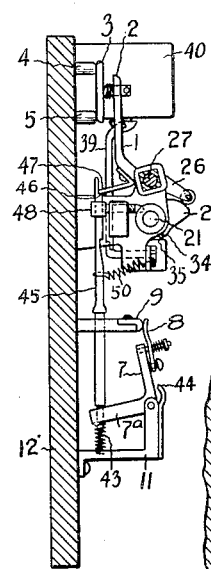
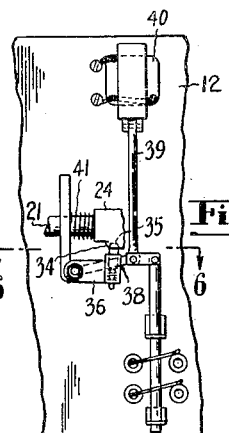
Fig. 4.
Inventor
W. H. Leslie
By J. Edw. Maybee
ATTY March 15, 1938. W. H. LESLIE 2,111,269
MOTOR CONTROL SYSTEM
Filed April 5, 1937 3 Sheets-Sheet 2
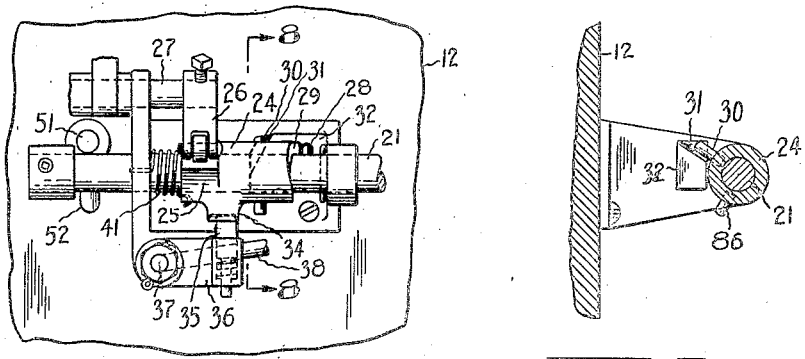
Fig. 7.
Fig. 8.
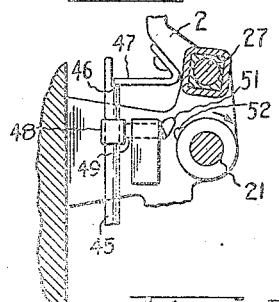
Fig. 9.
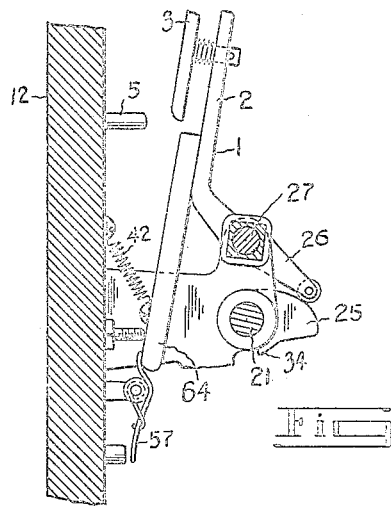
Fig. 10.
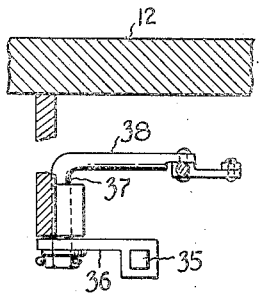
Fig. 6.
Inventor
W. H. Leslie
by J. Edw. Maybee
ATTY

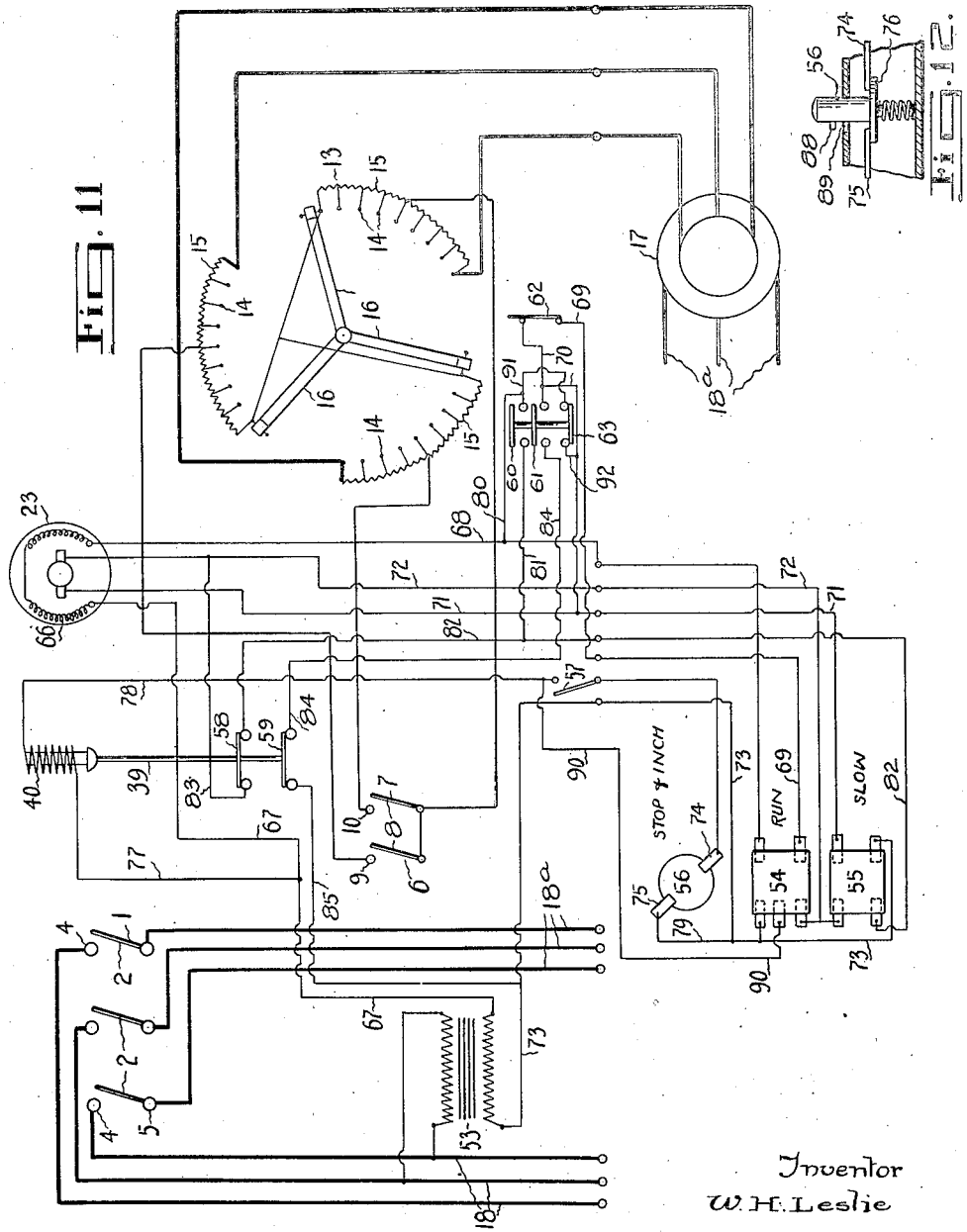

Patented Mar. 15, 1938

2,111,269

UNITED STATES PATENT OFFICE 2,111,269

MOTOR CONTROL SYSTEM

William H. Leslie, Toronto, Ontario, Canada

Application April 5, 1937, Serial No. 134,936

17 Claims. (Cl. 172—179)

This invention relates to motor control systems and the object of the invention is to devise simple and effective apparatus of this character in which the use of electro-magnetic means is reduced to a minimum. Further objects I have in mind will hereinafter appear.

I attain my object by providing power driven means for positively actuating the main, torque, and dial switches in systems for controlling motors and more particularly motors used for driving printing presses. The said means is driven by a pilot motor which is controlled by auxiliary push button switches so that by pushing one of the button switches the main switch will be closed, the torque switch will be closed temporarily and then automatically opened and the press motor will be accelerated to the desired speed. By pushing another of the button switches, the speed of the press motor will be decreased. When another of the push buttons is operated, the main switch is opened and the pilot motor is reversed to return the dial switch to its initial position. The last and first mentioned button switches may also be operated together to intermittently energize the press motor and thus obtain "inch" movements of the press cylinders.

The constructions are hereinafter more fully described and are illustrated in the accompanying drawings in which Fig. 1 is a front elevation of the mechanism in the control system;

Fig. 2 a cross section on the line 2—2 in Fig. 1;

Fig. 3 a view similar to Fig. 2 showing the main and torque switches closed;

Fig. 4 an enlarged detail of some of the parts shown in Fig. 3 showing how the torque switch is opened automatically;

Fig. 5 a front elevation of some of the parts of Fig. 1 showing the solenoid controlled means for releasably retaining the main switch closed;

Fig. 6 a section on an enlarged scale, on the line 6—6 in Fig. 5;

Fig. 7 a front elevation of the sleeve in its releasably locked position;

Fig. 8 a section on the line 8—8 in Fig. 7;

Fig. 9 an enlarged view of some of the parts shown in Fig. 2 showing the shaft rotating in a reverse direction without releasing push rod from engagement with its finger on the main switch;

Fig. 10 a sectional detail of the parts for holding the solenoid switch open when the main switch is open;

Fig. 11 a wiring diagram; and

Fig. 12 a diagrammatic view of the "stop and inch" switch.

In the drawings like numerals of reference indicate corresponding parts in the different figures.

1 is the main switch comprising one or more movable arms 2 suitably insulated from one another. Each arm carries a contactor 3 adapted to yieldably engage two stationary contacts 4, 5 for electrically connecting said contacts.

A torque switch 6 is provided with a movable arm 7 having one or more contactors 8 adapted to yieldably engage a stationary contact 9. The arm 7 is formed as a bell crank pivoted on a bracket 11 secured to a panel 12 on which the contacts 4, 5 and 9 are secured.

A dial switch or rheostat 13 includes one or more sets of contacts 14, each set being connected with a resistance 15 and having an arm 16 adapted to be moved across the contacts to vary the resistance and thus control the speed of a motor 17 for driving a printing press or the like. In the drawings a three-phase motor 17 is shown and the main switch 1 has three arms 2 for connecting, by means of the wires 18ª, a three wire lead-in 18 from a source of electrical supply to the field coils of the motor. Three sets of contacts 14 and three arms 16 are employed in the dial switch 13. The sets of contacts 14 are connected with the armature windings of the motor 17. The torque switch 6 has two contactors 8 which are electrically connected together and with one of the sets of contacts 14 intermediate the ends thereof to cut out a predetermined portion of the resistance 15. The contacts 9, 10 engageable by the contactors 8 are connected with the other sets of contacts 14 so that substantially equal portions of all the resistances 15 will be cut out simultaneously when the torque switch is closed.

The hereinbefore mentioned switches are old per se and therefore are only briefly described. Heretofore the switches 1 and 6 have been operated by solenoids and the switch 13 has been operated manually or by a pilot motor.

The arms 16 of the dial switch 13 extend radially from a common hub to which is secured a worm wheel 19 which is meshed with a worm 20 on a shaft 21. The shaft is driven by worm gearing 22 from the armature shaft of a reversible pilot motor 23. All these parts are suitably supported and journalled on the panel 12.

To close the main switch 1, I provide mechanism which is operated by the pilot motor 23 (when it is initially started to turn the arms 16 in a direction to increase the speed of the press motor 17). The mechanism comprises a sleeve 24 provided with a cam 25 adapted to engage and rock a finger 26 on a collar secured to a spindle 27. The latter is suitably journalled in bearings carried by the panel 12 and to the spindle are secured the switch arms 2 which are suitably insulated from one another and from the spindle. The sleeve 24 is disposed on the shaft 21, is axially movable thereon and has a disengageable drive connection therewith. This connection comprises a pin 28 carried by the shaft and a shoulder 29 formed on one end of the sleeve. The latter is adapted (after it has been turned sufficiently with the shaft to cause the high portion of the cam 25 to rock the finger 26 and close the switch 1) to be moved axially to clear the pin 28 whereby the rotation of the shaft 21 may be continued to operate the dial switch 13. The axial movement is imparted to the sleeve by means of a projection 30 carried thereby which engages an inclined face 31 on a stationary member 32 which may be formed on the adjacent bearing bracket for shaft 21. After the sleeve has been turned by the pin 28 to close the switch 1, the projection 30 engages and rides down the inclined face 31 to disengage the shoulder 29 from the pin 28.

To releasably retain the sleeve 24 in its switch closing position independently of the shaft 21 so that the switch will be maintained closed while the shaft is further employed to operate the speed controlling switch 13 for the motor 17, releasable locking means is provided. A keeper 34 carried by the sleeve is adapted to be operatively engaged by a latch 35 mounted on an arm 36 secured to the free end of the journal 37 of a crank arm 38. The crank portion of said arm may be formed integral with the journal and is pivotally connected with the movable core 39 of a solenoid 40. When the solenoid is energized the core is attracted to move upwardly (in the drawings) and rock the crank arm 38 to position the latch 35 behind the keeper 34 on the sleeve 24. The latch is provided with a bevelled face and is spring actuated on its arm 36 so that the keeper may be rocked over the bevelled face of the latch to enable the latter to snap into operative engagement with the keeper immediately the sleeve has been turned sufficiently to close the switch 1. With this arrangement it is not necessary to have the latch work in perfect synchronism with the sleeve.

When the solenoid is de-energized, the core drops by gravity or is spring actuated to move the latch 35 out of the path of the keeper 34 and thus release the sleeve 24. A spring 41 disposed on the shaft 21 has one end secured to a stationary part and the other end secured to the adjacent end of the sleeve 24 remote from the shoulder 29. This spring tends to turn the sleeve on the shaft to permit a spring 42 to open the switch 1. The spring 41 also shifts the sleeve 24 to re-establish the drive connection between the shoulder 29 and the pin 28. The de-energization of the solenoid thus results in the sleeve 24 being returned to its initial position and the switch 1 opened.

The torque switch 6 is provided with a spring 43 to normally maintain it open. The switch is closed temporarily when the main switch 1 is closed so that additional current will be supplied to the motor 17 to overcome inertia. The spring 43 engages the underside of one arm 7ᵃ of the bell crank 7, the other arm of which is forked and carries the contactors 8. The movement of the bell crank by the spring 43 is limited by a stop 44. A push rod 45 engaging the upper side of the arm 7ᵃ is provided with a shoulder 46 which is engaged by a finger 47 secured to one of the arms 2 of the main switch 1 so that the torque switch will be closed when the main switch is closed. The upper end of the push rod passes through a guide 48 on a plunger 49 which is slidably mounted in a suitable stationary part, the axis of the plunger being substantially at right angles to the axis of the push rod. A spring 50 tends to move the push rod to retain its shoulder in engagement with the finger 47 and tends to position the end 51 of the plunger for engagement by a projection 52 carried by the shaft 21. The projection 52 is so positioned relative to the pin 28 that after the latter has turned the sleeve 24 to close the main switch 1 and thus the torque switch 6, the projection 52 engages the end 51 of the plunger 49 to move it axially and thus shift the push rod 45 to disengage the shoulder 46 from the finger 47. The spring 43 then opens the torque switch and the spring 50 holds the push rod against the end of the finger 47 until the switch 1 is opened again whereupon the finger will be moved to a position above the shoulder to engage it again when the switch 1 is next closed. The end 51 of the plunger has a rule joint connection therewith so that it may be moved by the projection 52 on the shaft 21 out of the path of the projection when the shaft is rotated in the reverse direction, as hereinafter described.

The solenoid 40 and pilot motor 23 are connected in circuits which may be energized by a transformer 53 connected with two of the line wires 18. These circuits are controlled by manually operable push button switches 54, 55, 56, by solenoid operated switches 58, 59, and by mechanically operated switches 57; 61; 62; 63. The switch 57 in the main solenoid circuit is provided with a spring normally tending to close it and is adapted to be engaged by a tang 64 on one of the switch arms 2 (when the main switch 1 is opened) to open the switch 57. The switches 58, 59 in one of the pilot motor circuits are closed when the solenoid is de-energized and opened when the solenoid is energized. The switches 60, 61 in another of the circuits for the pilot motor are engaged by one of the dial switch arms 16 to open said circuit when the dial switch is moved to its initial position in which the motor 17 will be stopped or driven at its slowest speed. As the arms 16 move to increase the speed of the motor, the switches 60 and 61 will be closed by a spring 65 to condition the reversing circuit for closure. The switch 62 is spring actuated to normally close it and is adapted to be engaged by an arm 16, when it reaches the position in which the motor 17 will be driven at its highest or at a predetermined speed intermediate its low and high speeds, to open the switch 62 and stop the pilot motor. The switch 63 is adapted to be closed just prior to the opening of the switches 60, 61 to cause the flow of energy through the armature windings of the pilot motor to be so directed momentarily while the motor is running to act as a dynamic brake for the motor and thus prevent it from over-running after its circuit has been opened by the switches 60, 61.

The "run" switch 54 is adapted, when closed, to electrically connect the contacts at the right hand side of the switch in the wiring diagram in Fig. 11. It is also adapted to connect together the contacts at the left hand side of the switch whereby the solenoid 40 will be energized to open the switches 58, 59 and the pilot motor will also be energized. When the "run" switch 54 is closed a solenoid circuit is closed whereby current will flow from the transformer 53 through the wires 67, 77, solenoid 40 wire 78, 90, through the contacts at left side of "run" switch 54, wire 73 to transformer. Current will also flow from the transformer 53, through wire 67 to pilot motor field coils 66, wire 68 through right hand button switch contacts, wire 69, switch 62, wires 70, 71 through left hand side of pilot motor armature windings, wire 72 through button switch contacts at left hand side, wire 73 to transformer. The pilot motor is thus energized to drive the shaft 21, and turn the sleeve 24 to close the main switch 1. Immediately this happens, the spring actuated switch 57 is permitted to close another solenoid circuit and thus maintain the solenoid 40 energized to releasably lock the sleeve 24 in its switch closing position and to maintain the switches 58, 59 open after the "run" switch 54 is opened. The second solenoid circuit is conditioned for closure by two contacts 74, 75 in the "stop and inch" push button switch 56. These contacts are normally electrically connected together by a spring actuated switch plate 76 so that when the switch 57 is closed current will flow from the transformer 53, through wires 67, 77 switch 57, solenoid 40, wire 78, contact 74, switch plate 76, contact 75, wires 79 and 73 to transformer and thus complete the second solenoid circuit whereby the switches 58 and 59 will remain opened, and the sleeve 24 locked to retain the switch 1 closed.

So long as the "run" push button switch 54 is held closed, the pilot motor 23 will be energized and the shaft 21 will be driven to move the dial switch arms 16 in a direction of rotation to cause the speed of the motor 17 to be increased. During the initial movement of the shaft 21 to close the switch 1, the torque switch 6 is also closed and opened again, the switches 60 and 61 are closed, and the switch 63 opened as hereinbefore described. When the arm 16 engages and opens the switch 62, the pilot motor 23 is stopped with the switch 1 still closed to energize the motor 17.

To decrease the speed of the motor 17, the "slow" push button switch 55 is closed which causes the direction of the flow of energy through the pilot motor armature windings to be reversed. The arms 16 of the dial switch 13 are thus turned backwardly to increase the resistance 15 to the motor 17. The "slow" switch 55 is adapted to electrically connect the two contacts at the right hand side of the switch and at the same time connect the two contacts at the left hand side of the switch whereby current will flow from transformer through wire 67, field coils 66, wires 68, 80, switch 60 (now closed) wires 81, 82 through button switch contacts at left hand side thereof, wire 72, right hand side of pilot motor armature windings, wire 71, switch contacts at right hand side thereof, wire 73 to transformer. The pilot motor is thus reversed to reverse the direction of rotation of the shaft 21 and of the arms 16 of the dial switch 13 without affecting the main switch which remains closed to energize the motor 17.

To stop the press motor 17 and return all the parts of the control mechanism to their initial positions, the "stop and inch" button switch 56 is depressed to break the connection between its contacts 74 and 75. The solenoid is thus de-energized to release the latch 35 from the keeper 34 on the sleeve 24 whereby the spring 41 will turn the sleeve to permit the spring 42 to open the main switch 1. A pin 86 on the sleeve 24 is adapted to engage a stationary part to limit the return rotary movement imparted by the spring 41 to the sleeve. The spring 41 also shifts the sleeve along the shaft to re-establish the disengageable drive connection between the shoulder 29 and pin 28. Immediately the solenoid is de-energized the switches 58, 59 are closed and when the main switch 1 is opened the switch 57 is opened. The switches 60, 61 remain closed and the switch 63 remains open. The pilot motor is reversed to return the dial switch arms 16 to their initial position, as follows:—current from the transformer 53 is passed through wire 67, field coils 66, wires 68, 80, switch 60, wires 81, 82, switch 58, wires 83, 72 to right hand side of pilot motor armature windings, wires 71, 70, switch 61, wire 84, switch 59, wires 85, 73 to transformer. When the arms 16 are returned to their initial positions, switches 60 and 61 are opened to stop the pilot motor. The switch 62 is closed shortly after the arms 16 begin their return movement so that the circuit for operating said motor to accelerate the press motor 17 is conditioned for closure upon the next operation of the "run" button switch 54.

To intermittently energize the press motor 17 so that the press may have an "inch" movement, the "stop and inch" push button switch 56 is moved to open the contacts 74, 75. While this switch may be of any suitable type, I have shown a spring actuated normally closed type. To facilitate the holding of the plate 76 out of engagement with the contacts 74 and 75, I provide the button with a pin 88 adapted to pass through a slot 89 in the switch casing and engage the underside thereof when the button is turned to move the pin out of the register with the slot. When the "stop and inch" switch 56 is depressed to break the normal connection between the contacts 74, 75 and the "run" push button switch 54 is also depressed, the pilot motor 23 is energized to close the main switch 1 only while the "run" switch is held closed. Of course, the torque switch 6 is also closed and opened again as before and the pilot motor is reversed to return the dial switch 13 to its initial position when the "run" switch is released. The pilot motor circuit through the switch 62 is the same as heretofore described in connection with the "run" switch and when the shaft 21 is rotated to close the main switch 1 the solenoid switch 57 is closed as heretofore described but the solenoid main circuit is not closed because the contacts 74, 75 are disconnected. Therefore the solenoid is now energized only while the "run" button switch is closed and the circuit for the solenoid is the first mentioned circuit from transformer through wires 67, 77 solenoid 40, wires 78, 90, through contacts at left side of "run" switch 54, wire 73 to the transformer. The switches 58, 59 are opened while the solenoid is energized and the switches 60, 61 are closed shortly after the pilot motor is energized. Immediately the "run" switch is opened both the pilot motor and the solenoid are de-energized which results in the main switch 1 being opened and the switches 58 and 59 in the pilot motor reversing circuit being closed. The switches 60, 61 are now closed and the direction of rotation of said motor is reversed as hereinbefore described. When the arms 16 of the dial switch 13 are returned to their initial positions, the switches 60 and 61 are opened to break the reversing circuit of the pilot motor.

To prevent overrunning of the pilot motor after its circuit is broken by the opening of the switches 60, 61 I provide a dynamic brake for said motor comprising means for shorting the current through the armature windings just before the pilot motor circuit is broken. These means include the switch 63 which is open when the switches 60, 61 are closed and vice versa and which is adapted to be closed by the dial switch arm 16 just before the switches 60, 61 are opened thereby. The current flowing through the wire 80 to the switch 60 now passes through the wire 91 to the switch 63, wires 92, 70, 71 to the left side of the armature winding, wires 72, 83, switch 58, wires 82, 81, switch 60 back to wire 91 whereby the armature windings are shorted just before the switches 60, 61 are opened to break the circuit to the pilot motor. Immediately the switches 60, 61 are opened, the switch 63 is ineffective and thus the short circuit of the armature windings is relieved.

It will be noted that whenever the "stop and inch" push button switch 56 is operated to stop the press motor 17 or when the "run" push button switch 54 is released after it has been depressed to "inch" the press motor 17, the pilot motor 23 is automatically reversed to return the dial switch arms 16 to their initial positions so that the press motor will always start on slow speed.

By simultaneously energizing the solenoid 40 and the pilot motor 23, the switches 58, 59 are opened before the dial switch arm 16 is moved sufficiently to permit the switches 60, 61 to close. This prevents the pilot motor from being short circuited through the switches 60, 61 which would occur if the switches 60, 61 were closed before the switches 58, 59 are opened. When the dial switch arm 16 has been moved sufficiently, the switches 60, 61 will be closed to condition the circuit to reverse the pilot motor. The latter will be automatically reversed to return the dial switch arms 16 to their initial positions immediately the solenoid is de-energized.

What I claim as my invention is:—

1. A motor control system comprising a mechanically operable main switch for a motor; means for controlling the speed of the motor; means for operating the speed controlling means; mechanism mechanically actuated by the operating means for closing the main switch; and means for releasably engaging the said mechanism to retain the main switch closed independently of the means for operating the speed controlling means.

2. A motor control system comprising a mechanically operable main switch for a motor; means for controlling the speed of the motor; means for operating the speed controlling means; mechanism mechanically actuated by the operating means for closing the main switch; and means mechanically controlled by the main switch when it is moved to its closed position for releasably locking the mechanism to retain the main switch closed independently of the means for operating the speed controlling means.

3. A motor control system comprising a main switch for a motor; means including resistance for controlling the speed of the motor; means for operating the controlling means; mechanism operable by the said operating means for closing the main switch; means controlled by the movement of the main switch when it is moved to its closed position for releasably locking the mechanism to retain the main switch closed independently of the means for operating the speed controlling means; a normally open torque switch adapted when closed to cut out a predetermined portion of the resistance in the speed controlling means; releasable means for temporarily closing the torque switch when the main switch is initially closed; and means actuated by the said operating means to release the torque switch closing means to permit said torque switch to open shortly after it has been closed.

4. A motor control system comprising a main switch for a motor; means for controlling the speed of the motor; means including a pilot motor and a shaft driven thereby for operating the controlling means; mechanism operable to close the main switch; a disengageable drive connection between said mechanism and said shaft to cause the switch to be closed upon an initial rotary movement of the shaft, the drive connection having provisions for releasing it from operative engagement with the shaft to permit the continued rotation of the latter to operate the controlling means; and means mechanically controlled by the main switch for releasably retaining the mechanism in its switch closing position after the switch is closed and while the drive connection is released.

5. A motor control system comprising a main switch for a motor, the said switch having a movable switch arm; mechanism operable to move the arm to close the switch; a rotatable shaft; a disengageable drive connection between said shaft and mechanism to cause the arm to close the switch upon an initial rotary movement of the shaft, the drive connection having provisions for releasing it from operative engagement with the shaft to permit the continued rotation of the latter relative to the mechanism; and means for releasably locking the mechanism in its switch closing position after the switch has been closed.

6. A motor control system comprising a main switch for a motor, the switch having a pivoted switch arm; a rotatable shaft; a sleeve axially movable on said shaft and provided with a cam; a finger connected with the switch arm adapted to be engaged and rocked by the cam to move the switch arm to close the switch; a drive connection between the sleeve and shaft to turn the cam into operative engagement with the finger and close the switch, the said connection being disengageable by axial movement of the sleeve on the shaft; means for releasably retaining the sleeve in its switch closing position; and means for shifting the sleeve axially of the shaft to release the drive connection after the switch is closed whereupon the rotation of the shaft may be continued with the switch closed.

7. A motor control system comprising a main switch for a motor, the switch having a pivoted switch arm; a rotatable shaft; a sleeve axially movable on said shaft and provided with a cam; a finger connected with the switch arm adapted to be engaged and rocked by the cam to move the switch arm to close the switch; a drive connection between the sleeve and shaft to turn the cam into operative engagement with the finger and close the switch, the said connection being disengageable by axial movement of the sleeve on the shaft; a keeper on the sleeve; a latch adapted to engage the keeper to releasably retain the sleeve in position to close the switch; electromagnetic means adapted when energized to move the latch into position to engage the keeper, the said electro-magnetic means being mechanically controlled by the main switch when it is closed to releasably retain the latch in locking engagement with the keeper; and means for shifting the sleeve axially of the shaft to release the drive connection after the switch is closed whereupon the rotation of the shaft may be continued with the switch closed.

8. A motor control system comprising a main switch for a motor, the switch having a pivoted switch arm; a rotatable shaft; a sleeve axially movable on said shaft and provided with a cam; a finger connected with the switch arm adapted to be engaged and rocked by the cam to move the switch arm to close the switch; a disengageable drive connection between the sleeve and shaft to turn the cam into operative engagement with the finger and close the switch; means for releasably retaining the sleeve in its switch closing position; a stationary member, one of said member and sleeve parts having an inclined face and the other of said parts having a projection for engaging said face to cause the sleeve to be shifted axially of the shaft to release the drive connection after the switch is closed whereupon the rotation of the shaft may be continued with the switch closed.

9. A motor control system comprising a main switch for a motor; mechanism for closing the main switch; a solenoid; means connected with the core of the solenoid for releasably locking the mechanism to retain the main switch closed when the solenoid is energized, the said locking means being adapted to release the mechanism when the solenoid is de-energized; and a circuit for energizing the solenoid including a normally closed manual switch and a normally closed spring actuated switch, the last mentioned switch being moved by the main switch when it is opened to open the said circuit and being permitted to close the circuit by the movement of the main switch to its closed position.

10. A motor control system comprising a main switch for a motor, the switch having a movable switch arm; means including resistance for controlling the speed of the motor; means including a rotatable shaft for operating the controlling means; a sleeve having a disengageable drive connection with the shaft; means for moving the switch arm to close the switch upon a rotary movement of the sleeve in one direction of rotation; means for releasably engaging the sleeve to retain the switch closed; means for releasing the drive connection after the switch is closed whereupon the rotation of the shaft may be continued to operate the controlling means; a normally open torque switch adapted when closed to cut out a portion of the resistance in the speed controlling means; a push rod engaging said torque switch; a finger on said switch arm for engaging the push rod to move the torque switch to its closed position; a projection carried by the shaft; and means for yieldingly positioning the push rod for engagement by the finger, the said means including provisions for engagement by the projection to cause the push rod to be displaced laterally to disengage it from the finger and permit the torque switch to open.

11. A motor control system comprising a main switch for a motor, the switch having a movable switch arm; means including resistance for controlling the speed of the motor; means including a reversible pilot motor and a shaft driven thereby for operating the controlling means backward or forward to vary the speed of the first mentioned motor; a sleeve having a disengageable drive connection with the shaft; means for moving the switch arm to close the switch upon a rotary movement of the sleeve in one direction of rotation; means for releasably engaging the sleeve to retain the switch closed; means for releasing the drive connection after the switch is closed whereupon the rotation of the shaft may be continued to operate the controlling means; a normally open torque switch adapted when closed to cut out a portion of the resistance in the speed controlling means; a push rod engaging said torque switch; a finger on said switch arm for engaging the push rod to move the torque switch to its closed position; a projection carried by the shaft; means including a spring and a plunger having a guide for the push rod to position it for engagement by the finger; an end on the plunger having a rule joint connection therewith, the said end being adapted to be engaged by the projection to shift the push rod out of engagement with the finger when the shaft is driven in one direction of rotation, the said end being adapted to be swung out of the path of the projection when the shaft is driven in the opposite direction of rotation.

12. A motor control system constructed according to claim 6 in which the switch arm is spring urged to open the switch and a spring is provided to turn and shift the sleeve along the shaft to permit the switch to open and to re-establish the drive connection when the sleeve retaining means is released.

13. A motor control system comprising a main switch for a motor; means for controlling the speed of the motor; means for operating the speed controlling means; mechanism mechanically actuated by the operating means for closing the main switch; electro-magnetic means; means for energizing said electro-magnetic means including a switch controlled by the main switch and a normally closed manual switch, the electro-magnetic means being energized when the main switch is closed and de-energized when the manual switch is opened; means operable by the electro-magnetic means when energized to releasably lock the mechanism to retain the main switch closed, the electro-magnetic means when de-energized being adapted to release the mechanism to permit the main switch to open.

14. A motor control mechanism comprising a main switch for a motor; means for controlling the speed of the motor; means including a pilot motor for operating the controlling means; mechanism operable by the operating means for closing the main switch; means for releasably locking the mechanism to retain the main switch closed; manually operable means for controlling the operation of the pilot motor and the releasable locking means; manually operable means for conditioning the pilot motor to reverse its direction of rotation; and means for reversing the direction of rotation of the pilot motor when the first mentioned manually operable means is released so that the speed controlling means will be automatically returned to its initial position.

15. A motor control system comprising a main switch for a motor; means including resistance for controlling the speed of the motor; means for operating the controlling means; mechanism operable by the said operating means for closing the main switch; means controlled by the movement of the main switch when it is moved to its closed position for releasably locking the mechanism to retain the main switch closed independently of the means for operating the speed controlling means; a normally open torque switch adapted when closed to cut out a predetermined portion of the resistance in the speed controlling means; a push rod engaging said torque switch; a finger carried by the main switch for engaging the push rod to move the torque switch to its closed position; means for yieldingly positioning the push rod for engagement by the finger; means actuated by the said operating means to cause the push rod to be displaced laterally to disengage it from the finger and permit the torque switch to open.

16. A motor control system comprising a main switch for a motor; means for controlling the speed of the motor; means including a rotatable shaft for operating the speed controlling means; mechanism operable to close the main switch; a disengageable drive connection between said mechanism and said shaft to cause the main switch to be closed upon an initial rotary movement of the shaft and thereafter release the mechanism from the shaft so that the continued rotation of the shaft will operate the speed controlling means; and means for releasably locking the mechanism in its switch closing position when the switch is closed.

17. A motor control system comprising a main switch for a motor; means for controlling the speed of the motor; means including a rotatable shaft for operating the speed controlling means; mechanism operable to close the main switch; a disengageable drive connection between said mechanism and said shaft to cause the main switch to be closed upon an initial rotary movement of the shaft and thereafter release the mechanism from the shaft so that the continued rotation of the shaft will operate the speed controlling means; electro-magnetic means; means operable by the electro-magnetic means when energized to releasably lock the mechanism in its switch closing position, the said locking means being adapted to release the mechanism when the electro-magnetic means is de-energized; and a circuit for energizing the electro-magnetic means including a switch automatically closed when the main switch is closed; and a normally closed manual switch adapted to condition the circuit for closure by the automatic switch.

WILLIAM H. LESLIE.